(12) United States Patent
Uerz et al.

(10) Patent No.: US 7,449,501 B2
(45) Date of Patent: Nov. 11, 2008

(54) INK JET COMPOSITION CONTAINING MICROGEL PARTICLES

(75) Inventors: David S. Uerz, Ontario, NY (US); Hwei-Ling Yau, Rochester, NY (US); Wendy S. Krzemien, Hilton, NY (US); James A. Reczek, Rochester, NY (US); Xiaoru Wang, Webster, NY (US); David E. Decker, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 732 days.

(21) Appl. No.: 10/984,302

(22) Filed: Nov. 9, 2004

(65) Prior Publication Data

US 2006/0100307 A1 May 11, 2006

(51) Int. Cl.
*C09D 11/00* (2006.01)
(52) U.S. Cl. ........................................ 523/160; 523/161
(58) Field of Classification Search ................. 523/160, 523/161
See application file for complete search history.

(56) References Cited

U.S. PATENT DOCUMENTS

| 6,087,051 | A | 7/2000 | Shoji et al. |
| 6,604,819 | B2 | 8/2003 | Nishita |
| 2002/0009547 | A1 | 1/2002 | Ito et al. |
| 2002/0156153 | A1 | 10/2002 | Tsang et al. |
| 2003/0005945 | A1 | 1/2003 | Onishni et al. |
| 2003/0069329 | A1* | 4/2003 | Kubota et al. ............... 523/160 |
| 2003/0085974 | A1 | 5/2003 | Shimomura et al. |
| 2003/0189626 | A1 | 10/2003 | Kataoka et al. |
| 2003/0193553 | A1 | 10/2003 | Issler |
| 2004/0017406 | A1 | 1/2004 | Kato et al. |
| 2004/0030001 | A1 | 2/2004 | Ma et al. |
| 2004/0032473 | A1 | 2/2004 | Ishimoto et al. |

FOREIGN PATENT DOCUMENTS

| JP | 2000-225695 | 8/2000 |
| JP | 2002-144551 | 5/2002 |
| JP | 2003-291484 | 10/2003 |

OTHER PUBLICATIONS

U.S. Appl. No. 10/984,092, filed herewith of Yau et al. "Ink Jet Ink Composition."
U.S. Appl. No. 10/984,717, filed herewith of Yau et al., "Overcoat Composition for Printed Images."
*British Polymer Journal* 21, 107-115(1989). "Reactive Microgels—Polymers Intermediate in Size Between Single Molecules and Particles" by W. Funke.
*Angew. Chem.*, pp. 1743-1747 (1988) by M. Antonietti.

* cited by examiner

*Primary Examiner*—Edward J Cain
(74) *Attorney, Agent, or Firm*—Sarah Meeks Roberts; Arthur E. Kluegel

(57) ABSTRACT

This invention relates to an ink jet ink composition comprising an aqueous medium and microgel particles, said particles comprising a crosslinked copolymer prepared from a monomer mixture comprising at least a crosslinking monomer, a polymerizable carboxylic acid monomer, and one or more polymerizable water insoluble vinyl type monomers. The ink composition may be a colorless ink or it may contain a colorant.

67 Claims, No Drawings

INK JET COMPOSITION CONTAINING MICROGEL PARTICLES

FIELD OF THE INVENTION

This invention relates to an aqueous ink jet ink or overcoat composition. In one embodiment the composition is substantially colorless. The invention provides photographic-quality printed images that have superb stain and scratch resistance.

BACKGROUND OF THE INVENTION

Ink jet printing is a non-impact method for producing printed images by the deposition of ink droplets in a pixel-by-pixel manner to an recording element in response to digital data signals. There are various methods that may be utilized to control the deposition of ink droplets on the recording element to yield the desired printed image. In one process, known as drop-on-demand ink jet, individual ink droplets are projected as needed onto the recording element to form the desired printed image. Common methods of controlling the projection of ink droplets in drop-on-demand printing include piezoelectric transducers and thermal bubble formation. In another process, known as continuous ink jet, a continuous stream of droplets is charged and deflected in an image-wise manner onto the surface of the recording element, while un-imaged droplets are caught and returned to an ink sump. Ink jet printers have found broad applications across markets ranging from desktop document and photographic-quality imaging, to short run printing and industrial labeling.

It is well known in the art that printed images generated using ink jet technology are not very stable with regard to environmental effects of light and ozone. Another problem with such printed images is that they are easily scratched during handling and are not resistant to typical aqueous solutions such as coffee, fruit punch, etc.

Several methods have been used to protect printed images generated using ink jet technology. One method is referred to as lamination and involves the application of a clear durable film over the printed image. Another method involves printing onto specially designed ink jet recording elements which are subsequently fused to form a clear durable film over the printing image. Both of these methods have drawbacks in that an integral or peripheral fusing station is required.

Another method for increasing the durability of printed images involves application of an overcoat composition onto the surface of the printed image using a brush, roller, sponge, etc. As the composition dries, a clear durable film is formed. This method is useful in a variety of commercial printing applications but is considered too impractical and undesirable for consumer use in the home. To this end, the use of a colorless ink supplied in a printhead of an ink jet printer has become increasingly popular. The printhead containing the colorless ink is typically part of the same carriage assembly containing colored inks, and the printer is instructed to jet the colorless ink either simultaneously with or after the colored inks are jetted.

U.S. Pat. No. 6,087,051; U.S. 2003/0193553 A1; U.S. 2003/0005945 A1; JP 2003-291484 A; JP 2000-225695 A; and JP 2002-144551 A describe methods of ink jet printing wherein a colorless ink is used to equalize gloss and/or provide image permanence. U.S. 2002/0156153 A1 describes the use of polymeric additives in fixatives for ink jet printing in order to improve print quality and image permanence attributes on plain paper. This application discloses that a wide variety of polymers can be used, as long the polymer glass transition temperature (Tg), melting temperature, and molecular weight each fall into a particular range. The fixatives, however, require high amounts of organic solvents for jetting, making the fixatives environmentally unfriendly and unsuitable for use on glossy ink jet recording elements.

U.S. Pat. No. 6,604,819 B2 relates to an ink jet image recording method that includes the application of a solution having fine polymer particles during or after printing colored inks in order to provide weather fastness. This patent states that the particles must have a weight average molecular weight of at least 100,000 such that a film is formed therefrom. However, polyurethanes having a weight average molecular weight of at least 100,000 are difficult to jet, especially from a thermal printhead.

U.S. 2002-0009547 A1 relates to a coating liquid for application to recorded images in order to provide image permanence, fixation and glossiness. This application discloses that fine polymer particles may be used in the coating liquid, and that it is especially desirable if the particles have an acid number of 100 or less. This application does not describe how the physical properties of polymers must be optimized in order to obtain jettability, stain resistance and rub resistance.

Several prior arts, such as US 2004/0030001, US 2004/0017406, US2004/0032473, US2003/85974 and US2003/189626 teach the use of a substantially colorless ink in the non-imaged areas of a print to reduce the gloss difference between the image and non-imaged area. The materials used in the colorless ink vary from inorganic particles to organic particles to water soluble polymers, but none of them teaches an ink formulation that can offer stain protection for a variety of ink jet media.

Therefore, there is a still a need for a coating composition formulation that can be jetted from an ink jet printhead reliably and can offer stain protection for commonly used inkjet media in the trade.

SUMMARY OF THE INVENTION

This invention provides an ink jet ink composition comprising an aqueous medium and microgel particles, said particles comprising a crosslinked copolymer prepared from a monomer mixture comprising at least a crosslinking monomer, a polymerizable carboxylic acid monomer, and one or more polymerizable water insoluble vinyl type monomers. This invention further provides an ink jet ink set comprising at least one substantially colorless ink composition comprising an aqueous medium and microgel particles; and at least one colored ink comprising an aqueous medium and a pigment or a dye. It also provides an ink jet printing method comprising the steps of:

A) providing an ink jet printer that is responsive to digital data signals;

B) loading said printer with an ink jet recording element

C) loading said printer with an ink jet ink composition comprising microgel particles; and D) printing on said ink jet recording element using said colorless ink jet composition in response to said digital data signals.

The ink or overcoat composition of the invention provides superior stain and scratch resistance when deposited on a substrate. The composition can be applied to a substrate using any conventional coating means, or it can be jetted using an ink jet printer. The ink has good jettability. It is durable and can be used for colorless inks.

DETAILED DESCRIPTION OF THE INVENTION

The ink jet ink composition of the invention comprises an aqueous medium and microgel particles. The ink may be colored ink or, in one embodiment, a substantially colorless ink. A substantially colorless ink includes inks which may have some tinting to improve the color balance of the final image. However, by substantially colorless it is intended that such inks do not form the image itself. Rather, they are used as a protective coating or to change or enhance the gloss of the final image.

Microgel particles are highly crosslinked polymer particles prepared by emulsion polymerization. The definition of microgel particles can be found in British Polymer Journal 21, 107-115(1989) by W. Funke and in Angew. Chem., pp, 1743-1747 (1988) by M. Antonietti. Microgel particles are highly cross-linked and thus are not soluble in any solvents but are dispersible in water. The microgel particles used in the invention are preferred to have a Tg greater than 60° C. and more preferably greater than 100° C. The microgel particles preferably an average particle size between 10 and 90 nm and more preferably have an average particle size of less than 80 nm. More preferably the microgel particles have an average particle size of 20 to 80 nm, and most preferably the microgel particles have an average particle size of 30 to 70 nm. The microgel particles are preferably highly water-swellable. The preferred concentration of microgel particles in the ink composition is from 0.1% to 5%.

The microgel particles to be used in this invention can be broadly described as comprising crosslinked particles of a copolymer containing as its essential monomeric components a small amount of a crosslinking monomer, a polymerizable carboxylic acid monomer and one or more polymerizable low water-solubility vinyl monomers. In one embodiment, microgel particles suitable for use in this invention are typically comprised of, based on total weight of the monomer mixture, from about 5% to 50%, and more preferably from about 10 to 30%, of a polymerizable carboxylic acid monomer, and 1% to 20% of a crosslinking monomer, preferably difunctional. The balance of the microgel monomer mixture, 30% and above, typically comprises water-insoluble, ethylenically unsaturated or vinyl-type monomers.

Examples of the polymerizable carboxylic acid monomer are methacrylic acid, acrylic acid, crotonic acid, itaconic acid, maleic acid, fumaric acid, various other substituted carboxylic acid monomers containing from 3 to 8 carbon atoms such as 2-carboxyethylacrylate, 3-acryloamido-3-methyl-butanoic acid, 3-acryloamidohydroxy-acetic acid, acryloamidohexanoic acid, N,N-bisacryloamido-acetic acid, and the monoesters of dicarboxylic acids such as methyl hydrogen maleate, ethyl hydrogen fumarate, of which methacrylic acid is particularly preferred. More than one type of polymerizable carboxylic acid monomer may be used in the copolymer.

The vinyl type monomeric component of the microgel particles is relatively water-insoluble and carboxylic-free. Suitable monomers of this class include styrene, the o-,m-, and p-alkyl or aryl styrenes wherein the substituent group has from 1 to 8 carbon atom such as o-methylstyrene, m-ethylstyrene, p-methylstyrene, p-tert-butylstyrene, the 2,4-, 2,5- and 3,4-dimethylstyrenes, 4-methoxystyrene, 4-phenylstyrene, 4-phenoxystyrene, 4-benzylstyrene, 2,6-dimethylstyrene,2,6-dimethoxystyrene, 2,5-diethylstyrene, alpha-methylstyrene, 3,4-dimethylstyrene, halostyrenes such as 4-chlorostyrene, the 2,5-, 3,4- and 2,6-dichlorostyrene, and the corresponding fluorostyrenes and bromstyrenes; vinyl toluene, isopropenyl toluene, and vinylnaphthalene; alkyl or aryl esters of the ethylenically unsaturated carboxylic acids having from 1 to about 8 carbon atoms in the ester (alcohol) group, such as the methyl, ethyl, propyl, butyl, hexyl, ethylhexyl, phenyl, and benzyl methacrylates, acrylates, and crotonates; dimethyl maleate; dibutylmaleate; dibutylfumarate; dihexylitaconate; nitrile monomers, such as acrylonitrile and methacrylonitrile; vinyl esters such as vinyl acetate, vinyl propionate, vinyl stearate, vinyl butyrate, vinyl laurate; and mixtures thereof. Preferred monomers are styrene and its derivatives and methacrylate monomers such as methyl methacrylate and ethyl methacrylate, such that the resulting microgel particle has a Tg equal to or greater than 60° C. More than one type of polymerizable vinyl monomers may be used in the copolymer. Two or more preferred monomers can also be polymerized together in accordance with any of the various solubility and polymerizability requirements discussed above.

The crosslinking monomer is employed in an amount sufficient to crosslink the aqueous emulsion copolymer, thereby converting the copolymer to a non-linear polymeric microgel, without appreciably reducing the water-swellability. Typical amounts of the crosslinking, preferably difunctional, monomer are from 1 to 20% and more preferably from 2 to 10% of the total polymer composition. Illustrative of difunctional crosslinking agents which may be used in the present invention are compounds such as ethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethylacrylate, pentaerythritol tetramethacrylate, triallyl cyanurate, divinyl ethane, divinyl sulfide, divinyl sulfone, hexatriene, triethyleneglycol dimethacrylate, diallyl cyanamide, glycol diacrylate, ethylene glycol divinyl ether, diallyl phthalate, divinyl dimethyl silane and glycerol trivinyl ether, of which divinyl benzene and ethylene glycol dimethacrylate are particularly preferred.

In one embodiment said microgel particles are prepared by the polymerization of a monomer mixture comprising at least methyl methacrylate, methacrylic acid and a crosslinking monomer. More preferably the monomer mixture comprises 60 wt % to 85 wt. % methylmethacrylate, 10 wt % to 30 wt. % methacrylic acid, and 2 wt % to 15 wt. % of the crosslinking monomer. In one suitable embodiment the microgel particles are prepared by the polymerization of a monomer mixture comprising methyl methacrylate at 75 wt. %, methacrylic acid at 20 wt. %, and divinyl benzene at 5 wt. %, or the polymerization of a monomer mixture comprising of methyl methacrylate at 75 wt. %, methacrylic acid at 15 wt. %, and ethylene glycol dimethacrylate at 10 wt. %.

The microgel particles may be prepared by any conventional aqueous emulsion polymerization technique known to those skilled in the art. Suitable polymerization techniques of these types are described for example, in U.S. Pat. Nos. 3,492,252 and 4,139,514. Typically, the microgel particles are prepared by emulsifying the monomeric materials and water soluble polymerization catalysts, in water with a suitable emulsifier for the monomers, and then heating the resulting aqueous emulsion at a temperature of from 30° C. to 95° C., preferably from 60° C. to 80° C., in a stirred heated reactor for a time from one to four hours until the polymerization reaction is complete. The ratio of monomer to water media is selected in order to provide a polymer emulsion having a solids content of from 10 to 45%, and preferably from 20 to 40% by weight.

The polymerization process can be carried out batchwise or semi-continuously. It is possible to work entirely batchwise, emulsifying the entire charge of monomer and proceeding with polymerization. It is usually advantageous, however, to start with part of the monomers which are to be used and add monomers as polymerization proceeds. An advantage of the gradual addition of monomers lies in reaching a high solids content with optimum control of particle size distribution. The other advantage of the semi-continuous process is that the final microgel particles tend to have much smaller particle size. Typical emulsifiers and catalysts used for the preparation of microgel particles are listed in U.S. Pat. No. 4,560,714. A chain transfer agent may optionally be present during the polymerization reaction at a concentration of from 0 to 5%. The preferred chain transfer agents are those that are relatively water soluble since they are more effective in the aqueous polymerization systems than are those that are water insoluble. Illustrative of such materials are the known alkyl and aryl mercaptans such as the essentially water soluble butyl mercaptan, mercaptoacetic acid, mercaptoethanol, 3-mercapto-1,2-propanediol and 2-methyl-2-propanethiol. Many water insoluble mercaptans can also be used, such as t-dodecyl mercaptan, phenyl mercaptan, n-dodecyl mercaptan, and tetradecyl mercaptan.

In one embodiment the ink jet ink composition of the invention further comprises at least two different polymers, a first polymer and a second polymer, having a weight average acid number of 70 to 200. The composition may also comprise one or more additional polymers provided that the weight average acid number of all of the polymers is 70 to 200. The "weight average acid number" equals the weight percent of the $1^{st}$ polymer times the acid number of the 1st polymer+weight percent of the $2^{nd}$ polymer times the acid number of the $2^{nd}$ polymer, etc. The total weight percent of all polymers should equal 100 percent. The microgel particles are not polymers that are included in determining the weight average acid number. Preferably the at least two different polymers have a weight average acid number of 80 to 160. In a preferred embodiment the first polymer has an acid number of 60 to 100 and the second polymer has an acid number of 180 to 240.

Preferably the two different polymers are of two different classes of polymers. Examples of useful polymers include polyester, polyurethane or polymers derived from styrene and/or acrylic acid derivatives. Useful polymers will be described in more detail below. Preferably the first polymer is a condensation polymer and the second polymer is an addition polymer. It is also preferred that the molecular weight of both polymers is independently within the range of 6,000 to 30,000. In one embodiment of the invention the first polymer is a condensation polymer that has an acid number of 60 to 100 and a weight average molecular weight of greater than 10,000, and the second polymer is an addition polymer that has an acid number greater than 180 and a weight average molecular weight of less than 18,000. It is particularly preferred that the first polymer is a polyurethane polymer and the second polymer is an acrylic polymer.

Examples of useful condensation polymers include polyesters, polycarbonates, polyamides, polyimides, polyurethanes, polyethers, and polysiloxane. When the first polymer is a polyurethane, it has an acid number of 60 to 100, and preferably from 70 to 90. When used herein, the term "acid number", also known as "acid value", is defined by the number of milligrams of potassium hydroxide required to neutralize one gram of polymer. Thus, the acid number of a given polymer is related to the percent of acid-containing monomer or monomers. The higher the acid number, the more acid functionality is present in the polymer. The inventors have found that if the acid number is too high (greater than 100), then the ink jet ink composition will not provide adequate stain protection, and if the acid number is too low (less than 60), then the jettability of the ink composition using an ink jet printhead will be compromised, especially when using a thermal drop-on-demand printhead.

The invention preferably employs a polyurethane formed from at least one monomer comprising at least two hydroxyl groups and another monomer comprising at least two isocyanate groups. The acid number of the polyurethane is provided by acid groups that are, in turn, provided by the at least one monomer comprising at least two hydroxyl groups. The acid groups are preferably carboxylic acid groups, but any type of acid groups may be used. Examples of monomers comprising at least two hydroxyl groups and at least one carboxylic acid group are 2,2-bis(hydroxymethyl) propionic acid and the hydroxyethylether of 4,4-bis(4-hydroxyphenyl) valeric acid. Other examples are described in U.S. Pat. No. 6,268,101 B1 and U.S. 2003/0184629 A1 and references cited therein.

The polyurethanes are also preferably derived from a monomer having at least two isocyanate groups; diisocyanates are typically used in the art of polyurethane chemistry, but triisocyanates may also be used. Examples of diisocyanates include isophorone diisocyanate and others described in the above references.

The polyurethanes used in the invention are optionally derived from an additional monomer comprising at least two hydroxyl groups and which is different from the monomer having at least two hydroxyl groups and at least one carboxyl group. These optional monomers are typically higher molecular weight monomers having a molecular weight of less than 3000. They are often referred to in the art as polyols and examples include those described in the above references. Examples include polyols and polyhydroxy derivatives of polycarbonates, polyethers, polyesters, polyacetals, polyacrylates, polyester amides and polythioethers. Preferably the optional monomer is a polycarbonate. More preferably, the optional monomer comprising at least two hydroxyl groups is a poly(hexamethylene carbonate) diol.

The polyurethane used in the invention has a weight average molecular weight, Mw, of greater than 10,000. If Mw is less than 10,000, then the ink jet ink composition will not provide adequate stain and scratch resistance. The maximum Mw of the polyurethane is not particularly limited, but is generally dictated by the physical property requirements of the composition and the method by which it will be applied, as discussed below. If the ink composition is used as an ink jet ink for a thermal printhead, then the maximum Mw of the polyurethane is preferably 30,000.

The addition polymer (normally the second polymer) (this term includes copolymers) utilized in the invention may be formed from a mixture of vinyl or unsaturated monomers. Preferably the addition polymer has an acid number 180 to 240, and more preferably of 200 to 240. Preferably the polymer also has a weight average molecular weight less than 18,000, and preferably in the range of 6,000 to 16,000. In one embodiment, the mixture of monomers includes styrenic monomers. Preferred styrenic monomers include, but are not limited to, α-alkylstyrenes, trans-β-alkylstyrenes, alkylstyrenes, alkoxystyrenes, halogenated styrenes, vinyl naphthalenes and mixtures thereof. Specific examples of styrenic derivatives include styrene, α-methylstyrene, trans-β-methylstyrene, 3-methylstyrene, 4-methylstyrene, 3-ethyl styrene, 3-isopropyl styrene, 3-butyl styrene, 3-cyclohexyl styrene, 3,4-dimethyl styrene, 3-chlorostyrene, 3,4-dichloro styrene, 3,4,5-trichloro styrene, 3-bromo styrene, 3-iodo styrene, 3-fluoro styrene, 3-chloro-4-methyl styrene, benzyl styrene, vinyl naphthalene, divinylbenzene, methyl vinylbenzoate ester, vinylbenzoic acid, vinyl phenol, 3-methoxy styrene, 3,4-dimethoxy styrene, 3-methyl-4-methoxy styrene, acetoxystyrene, acetoxymethylstyrene and (t-butoxycarbonyloxy) styrene. The styrenic monomers may be substituted with ionic functionalities such as sulfonate and carboxylate. Specific examples include sodium styrenesulfonate and sodium vinylbenzoate.

In another embodiment, the mixture of monomers includes acrylic monomers. The term "acrylic monomer" as employed herein includes acrylic acid, acrylate esters and derivatives and mixtures thereof. Examples of acrylic acid monomers include but are not limited to alkylacrylic acids, 3-alkylacrylic acids and 3-haloacrylic acids. Specific examples include crotonic acid, cinnamic acid, citraconic acid, sorbic acid, fumaric acid, methacrylic acid, ethacrylic acid, 3-methylacrylic acid, 3-chloroacrylic acid and 3-chloromethacrylic acid.

Examples of acrylate esters include but are not limited to alkyl acrylates, aryl acrylates, alkyloxyalkyl acrylates, alkyloxyaryl acrylates, hydroxyalkyl acrylates, hydroxyaryl acrylates, crotonic esters, cinnamic esters, citraconic esters, sorbic esters and fumaric esters. Specific examples include n-butyl acrylate, methyl acrylate, ethyl acrylate, n-propyl acrylate, isopropyl acrylate, amyl acrylate, hexyl acrylate, n-octyl acrylate, lauryl acrylate, 2-chloroethyl acrylate, phenyl acrylate, benzyl acrylate, allyl acrylate, methyl 3-chloroacrylate, 2-ethylhexyl acrylate, 2-methoxyethyl acrylate, 2-(2-methoxyethoxy)ethyl acrylate, 2-ethoxyethyl acrylate, 2-(2-ethoxyethoxyl)ethyl acrylate, 2-hydroxyethyl acrylate, 2-hydroxypropyl acrylate, glycidyl acrylate, N,N-dimethylaminoethyl acrylate, trifluoroethyl acrylate, 2-sulfoethyl acrylate and the corresponding methacrylates.

Acrylic monomers useful in the present invention also include unsaturated anhydride and unsaturated imide monomers which may be completely or partially hydrolyzed after polymerization to form the corresponding carboxylic acid or amide functionality. Specific examples include but are not limited to maleic anhydride, methylmaleic anhydride, glutaconic anhydride, itaconic anhydride, citraconic anhydride, mesaconic anhydride, maleimide and N-methylmaleimide. Also useful are mono-ester and bis-ester derivatives of the aforementioned.

Other monomers useful in the present invention include acrylamide and derivatives such as but not limited to N-alkyl acrylamides, N-aryl acrylamides and N-alkoxyalkyl acrylamides. Specific examples include N-methyl acrylamide, N-ethyl acrylamide, N-butyl acrylamide, N,N-dimethyl acrylamide, N,N-dipropyl acrylamide, N-(1,1,2-trimethylpropyl) acrylamide, N-(1,1,3,3 -tetramethylbutyl) acrylamide, N-methoxymethyl acrylamide, N-methoxyethyl acrylamide, N-methoxypropyl acrylamide, N-butoxymethyl acrylamide, N-isopropyl acrylamide, N-s-butyl acrylamide, N-t-butyl acrylamide, N-cyclohexyl acrylamide, N-(1,1-dimethyl-3-oxobutyl) acrylamide, N-(2-carboxyethyl) acrylamide, 3-acrylamido-3-methyl butanoic acid, methylene bisacrylamide, N-(3-aminopropyl) acrylamide hydrochloride, N-(3,3-dimethylaminopropyl) acrylamide hydrochloride, N-(1-phthalamidomethyl) acrylamide, sodium N-(1,1-dimethyl-2-sulfoethyl) acrylamide and the corresponding methacrylamides.

Besides being derived from styrenic and acrylic monomers, the addition polymers useful in the present invention may have functionality derived from a variety of other types of monomers well known in the art of polymer chemistry. Such monomers include vinyl derivatives and ethylenically unsaturated compounds in general. Examples of these other monomer types include but are not limited to olefins (e.g., dicyclopentadiene, ethylene, propylene, 1-butene, 5,5-dimethyl-1-octene, etc.); halogenated olefins (e.g., vinyl chloride, vinylidene chloride, etc.); α-alkylalkenes, acrylonitriles, acroleins, vinyl ethers, vinyl esters, vinyl ketones, vinylidene chloride compounds, allyl compounds, and ethylenically unsaturated heterocyclic compounds. Specific examples include allyl acetate, allyl caproate, methyl vinyl ether, butyl vinyl ether, methoxyethyl vinyl ether, ethoxyethyl vinyl ether, chloroethyl vinyl ether, 1-methyl-2,2-dimethylpropyl vinyl ether, hydroxyethyl vinyl ether, diethylene glycolvinyl ether, dimethylaminoethyl vinyl ether, butylaminoethyl vinyl ether, benzyl vinyl ether, tetrahydrofurfuryl vinyl ether, vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, N-vinyl oxazolidone, N-vinylimidazole, N-vinylpyrrolidone, N-vinylcarbazole, vinyl thiophene and N-vinylethyl acetamide.

The addition polymers useful in the present invention may be derived from monomers capable of absorbing UV light after polymerization. Examples of such monomers are disclosed and claimed in U.S. patent application Ser. No. 09/999,469 filed Oct. 31, 2001 the disclosure of which is incorporated herein by reference. A variety of other types of monomers well known in the art of polymer chemistry can be used. Still other monomer types include multifunctional monomers having some combination of functionality described above.

Addition polymers useful in the present invention are commonly prepared by free radical polymerization of vinyl or ethylenically unsaturated monomers; however, other polymerization methods such as anionic polymerization, cationic polymerization, polyinsertion, and others well known in polymerization chemistry are also suitable. Synthetic techniques well known in the art of polymer chemistry include but are not limited to emulsion polymerization, solution polymerization, suspension polymerization and dispersion polymerization.

In one embodiment the acrylic polymer is a copolymer comprising benzyl methacrylate and methacrylic acid. In another embodiment, the addition polymer is a styrene-acrylic copolymer comprising a mixture of vinyl or unsaturated monomers, including at least one styrenic monomer and at least one acrylic monomer, at least one of which monomers has an acid or acid-providing group.

The following commercially available styrene-acrylic polymers may be employed in the composition of the invention, for example, styrene-acrylic polymer having acid number 240, sold as Joncryl® 70 from S.C. Johnson Co. (Wisconsin, USA); a styrene-acrylic polymer having acid number 230 sold as TruDot™ IJ-4655 from MeadWestvaco Corp. (Stanford, Conn., USA); a styrene-acrylic polymer having acid number 215 sold as Joncryl® 59 from S.C. Johnson Co.; a styrene-acrylic polymer having acid number 215 sold as Joncryl® 57 from S.C. Johnson Co.; a styrene-acrylic polymer having acid number 213 sold as Joncryl® 63 from S.C. Johnson Co.; a styrene-acrylic polymer having acid number 172 sold as TruDot™ IJ-4680 from MeadWestvaco Corp.; an acrylic resin having acid number 160 sold as Vancryl® 68S from Air Products and Chemicals, Inc. (Allentown, Pa.).

Prior to use, preferably the acid groups of the at least two different polymers are partially or completely neutralized. It is preferred that 50% or more of the acid groups of each polymer are neutralized. It is more preferred that 70% or more of the acid groups of each polymer are neutralized. The acid groups may be neutralized with any suitable base, examples of which include inorganic or organic bases such as alkali metal hydroxides, ammonia, mono-, di- and trialkyl- or aryl amines, nitrogen-containing heterocycles; and tetraalkyl- or aryl amines and the like. Specific examples of bases include sodium hydroxide, potassium hydroxide, lithium hydroxide, ammonia, triethylamine, triethanolamine, diethanolamine, 4-ethylmorpholine or dimethylethanolamine. The identity and amount of base used is dependent on the desirable viscosity, jettability through printhead type and print durability and other properties delivered by the ink composition of the present invention. In a preferred embodiment of the invention, an inorganic base such as sodium hydroxide or potassium hydroxide is used.

In one particularly suitable composition the polyurethane polymer has a molecular weight of 10,000 to 25,000 and an acid number of 70 to 90 wherein the acid number is provided by carboxylic acid groups. The polyurethane is derived from at least a first polycarbonate monomer comprising at least two hydroxyl groups, a second monomer comprising at least two hydroxyl groups and at least one carboxylic acid group, and a monomer comprising at least two isocyanate groups. The acrylic polymer has a molecular weight of 6,000 to 12,000, an acid number of 200 to 240, and is a copolymer comprising styrene and acrylic acid. 50% or more of the acid groups of each of the first and second polymers are neutralized.

The polymers employed in the present invention may be either water-soluble, or water-dispersible. By the term "water-soluble" is meant herein that the polymer is dissolved in water such that scattering is not observed when a dilute solution of the polymer is analyzed using dynamic light scattering or any other technique well known in the art of particle analysis. By the term "water-dispersible" is meant herein that the polymer exists in the form of particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

The ratio of the first (preferably a condensation polymer) polymer to the second (preferably an addition polymer) polymer is preferably 1:10 to 10:1 and more preferably 1:2 to 4:1. Both may be present in any amount so long as they meet the weight average acid number requirement. Factors that must be considered include durability, resolution and drop size capacity of the printhead, print speed, application method (pre, during or post colored inks) masking pattern, etc., as well as the properties of the ink and recording element used to form the printed image. In general, the first polymer is present in the composition in an amount of up to 20% by weight of the composition. The first polymer is preferably present in an amount of up to 10% by weight of the composition, and more preferably up to 5% by weight of the composition. In general, the second polymer is present in the composition in an amount of up to 20% by weight of the composition, preferably in an amount of up to 10% by weight of the composition, and more preferably up to 5% by weight of the composition. Generally both polymers are present in at least the amount 0.1% by weight.

The ink composition may also comprise, in addition to the microgel particles, only the polyurethane polymer that has an acid number of 60 to 100 and a molecular weight of greater than 10,000 or the acrylic polymer that has an acid number greater than 180 and a molecular weight of less than 18,000. These polymers may be those as described in detail above.

Particularly when used as a colorless coating in an overcoat format the polymers are present in the ink composition in an amount required to give a protective overcoat of desired water and stain resistance after the overcoat composition has been printed and dried. By the term "stain resistance" is meant herein that, after printing, the imaged recording element does not imbibe water or has a protective overcoat that prevents or minimizes water-based stains from discoloring the imaged side of the imaged-recording element. Furthermore, the overcoat thickness, or dry laydown of polymer, is not particularly limited, and is determined not only by the inherent capacity of that polymer to function as a protective overcoat, but also by numerous other factors as discussed above. The overcoat thickness is not particularly limited, but is preferably up to about 4 µm, and more preferably up to about 2 µm.

The exact choice of ink components will depend upon the specific application and performance requirements of the printhead from which they are jetted and the media type to be printed upon. Thermal and piezoelectric drop-on-demand printheads and continuous printheads each require ink compositions with a different set of physical properties in order to achieve reliable and accurate jetting of the ink, as is well known in the art of inkjet printing. Acceptable surface tensions are typically no greater than 60 dynes/cm, and preferably in the range of 20 dynes/cm to 45 dynes/cm.

When the composition is a substantially colorless composition it may be the same or different from the formulations of the colored inks that are used in that particular printhead or printing system. The ink compositions useful in the invention may include humectants and/or co-solvents in order to prevent the ink composition from drying out or crusting in the nozzles of the printhead, aid solubility of the components in the ink composition, or facilitate penetration of the ink composition into the recording element after printing.

Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, glycerol, 2-methyl-2,4-pentanediol, 1,2,6-hexanetriol, 2-ethyl-2-hydroxymethyl-1,3-propanediol, 1,5 pentanediol, 1,2-hexanediol, and thioglycol; (3) lower mono- and di-alkyl ethers derived from the polyhydric alcohols; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol. Typical aqueous-based ink compositions useful in the invention may contain, for example, the following components based on the total weight of the ink: water 20-95%, humectant(s) 5-70%, and co-solvent(s) 2-20%.

Other components present in the ink compositions of the invention include surfactants, defoamers, biocides, buffering agents, conductivity enhancing agents, anti-kogation agents, drying agents, waterfast agents, chelating agents, light stabilizers, or ozone stabilizers. When the ink is a substantially colorless ink or overcoat composition it may be colored with very small amounts of colorants in order to impart a desired hue to any or all of the printed image, or in some cases, to correct the color balance of a printed image. Useful colorants include pigments, dyes, polymeric dyes, loaded-dye/latex particles, or combinations thereof, and many of these types of colorants are well known in the art of ink jet inks. In general, colorants may be used in an amount of up to about 0.2% by weight of the composition.

If the ink jet ink composition is a colored ink it will also contain a colorant. The colorant can be either a dye or pigment commonly used in inkjet inks. These are well known in the art.

The invention further comprises an ink jet ink set comprising at least one substantially colorless ink composition comprising an aqueous medium and the microgel particles described above; and at least one colored ink comprising an aqueous medium and a pigment or a dye. The colored ink may be any suitable ink, such inks being known to those skilled in the art. In one embodiment the colored ink also further comprises the microgel particles described above.

The substantially colorless ink of the set may further comprise at least two different polymers, a first polymer and a second polymer, having a weight % acid number of 70 to 200. The polymers and parameters of the substantially colorless ink are as described in detail above. In one embodiment the colored ink also further comprises at least two different polymers as described above. The substantially colorless ink and the colored ink compositions may also comprise, in addition to the microgel particles, only the polyurethane polymer that has an acid number of 60 to 100 and a molecular weight of greater than 10,000 or the acrylic polymer that has an acid number greater than 180 and a molecular weight of less than 18,000.

The ink jet ink composition is applied to a printed image using an ink jet printhead. Any type of printhead may be used including, but not limited to, drop-on-demand printheads which utilize piezoelectric transducers or thermal bubble formation, or continuous printheads which utilize electrostatic charging devices and deflector plates. The invention is particularly suitable for use with a thermal printhead. Examples of printheads useful in the invention include those used in Canon USA, Inc., Hewlett-Packard Co., and Epson America Inc. desktop and wide-format ink jet printers, and in printing systems described in U.S. 2004/0100542 A1; U.S. 2003/0117465 A1; U.S. 2003/0043223 A1; U.S. Pat. No. 6,079,821; U.S. Pat. No. 6,450,619 B1; U.S. Pat. No. 6,217,163 B1; U.S. 2004/0032473 A1, U.S. 2003/0189626 A1, or U.S. 2004/0017406 A1. The printhead used in the invention may be part of any type of conventional inkjet printing system that deposits one or more inks or fluids onto an recording element.

When the composition is a substantially colorless composition the printhead containing the substantially colorless composition may be positioned in any one of the printhead ports intended for use with printheads containing colored inks, or it may be positioned in a printhead port that is intended for use with a colorless ink as described in the above references. The printhead containing the substantially colorless composition may be positioned on the same carriage assembly as the one used for colored inks, or it may be on a separate carriage assembly. The actual jetting of the substantially colorless composition may occur before, after, or at the same time as the colored inks, and either in the same pass as the one that jets the colored inks, or in a different pass.

When the ink jet ink composition is a substantially colorless ink composition it may be applied to a printed image that has been generated by just about any imaging means. Examples of imaging means include ink jet printing, thermal dye transfer printing, silver halide technology, offset printing, etc. It is especially desirable to print the substantially colorless ink composition on a printed image that has been generated by ink jet printing. In this case, virtually any combination of ink jet ink composition and recording element may be used to prepare the printed image. Ink jet ink compositions, well known in the art of ink jet printing, include both dye-based and pigment-based inks, and either may be used to generate the printed image. Representative examples of such inks are disclosed in U.S. Pat. Nos. 5,997,622; 5,985,017; 5,616,174; 5,738,716; 5,536,306; 4,381,946; 4,239,543; and 4,781,758.

The ink composition of the invention can be applied to various recording elements well known in the art of ink jet printing including both porous and swellable types, and either may be used to generate the printed image. Representative examples of such recording elements are disclosed in U.S. Pat. Nos. 6,045,917; 5,605,750; 5,723,211; 5,789,070 and EP 813 978 A1. In a preferred embodiment of the invention, porous recording elements are employed because they dry quickly. In another preferred embodiment of the invention, porous recording elements having high gloss are employed because they render photographic quality printed images.

When the ink composition is substantially colorless it is preferred that the ink be printed in a predetermined pattern or in image specific levels in various portions of the printed image rather than being applied as a uniform overcoating. This type of approach permits selective application of the substantially colorless ink to areas of the image where environmental protection or optical improvements are required and can decrease the total volume of liquid applied to the media resulting in higher image quality, reduced media cockle and lower media ink capacity media requirements. U.S. Pat. No. 5,515,479 teaches one such method for limiting the volume of colored ink used to print an image but it is obvious to one skilled in the art that similar approaches can be utilized for the application of substantially colorless materials.

The invention also comprises an ink jet printing method comprising the steps of:

A) providing an ink jet printer that is responsive to digital data signals;

B) loading said printer with an ink jet recording element;

C) loading said printer with an ink jet ink composition as described above; and

D) printing on said ink jet recording element using said colorless ink jet composition in response to said digital data signals. In a preferred embodiment the printer comprises a thermal printhead.

The following example is provided to illustrate, but not to limit, the invention.

EXAMPLES

Polymer Characterization

Weight Average Molecular Weight, $M_w$

Polymer samples were analyzed by size-exclusion chromatography using differential viscometry detection and a universal calibration curve as described in: T. H. Mourey and T. G. Bryan, *Journal of Chromatography A*, 964(2002) 169-178. The eluent employed was 1,1,1,3,3,3-hexafluoroisopropanol containing 0.01M tetraethylammonium nitrate. Columns used were two 7.5 mm×300 mm PLGel Mixed-C columns, available from Polymer Labs, and both columns were thermostated at 45° C. The absolute molecular weight distribution was calculated from viscosity data, and a universal calibration curve constructed from narrow-molecular weight poly(methylmethacrylate) standards between 620 (log M=2.79) and 1,450,000 (log M=6.16). Any portion of a polymer distribution appearing beyond the calibration range of the column set was not used for quantitative purposes. The ordinate "$W_n(\log M)$" was proportional to the weight fraction of the polymer at a given molecular weight on a logarithmic scale. Weight average molecular weight ($M_w$) and number average molecular weight ($M_n$) in HFIP at 45° C. are reported.

Calculated Acid Number, AN

Acid number is defined as the amount of KOH (in mg) required to neutralize 1 g of polymer. The acid number for each of the polymers was calculated using the amount of the monomer having a carboxylic acid group, the total amount of the monomers used in the synthesis of the polymer, and the molecular weight of the base used to neutralize the polymer according to the following equation:

$$AN = \left(\frac{\text{amount of } BHMPA \, (\text{mol})}{\text{total amount of monomers}(g)}\right)\left(MW \text{ of base}\left(\frac{g}{\text{mol}}\right)\right)(1000)$$

For example, referring to Polyurethane 1 of the Invention, PU-1, that is described below, the acid number was calculated as follows: the amount of the monomer having a carboxylic acid group was 0.432 mol, the total amount of the monomers used in the synthesis of the PU-1 was (136+57.9+107.8) g=301.7 g, and the molecular weight of KOH is 56 g/mol:

$$AN = \left(\frac{0.432 \text{ mol}}{301.7 \text{ g}}\right)\left(56 \frac{g}{\text{mol}}\right)(1000) = 80$$

Weight Average Acid Number of a Polymer Mixture
=(wt % of polymer A×acid number of polymer A)+(wt % of polymer B×acid number of polymer B)+(wt % of polymer C×acid number of polymer C)+ . . .
where the total wt % of all polymers is equal to 100%, Particle Size Measurement Polymer particles were characterized by an Ultrafine Particle Analyzer (UPA) manufactured by Leeds & Northrup. Two forms of a graph for presenting particle size data are obtained: the histogram and the cumulative plot. The 50 percentile point is used as the "average particle size".

Preparation of Microgel (MG) Particles and Comparative Particles (C) MG-1—Methyl Methacrylate/Divinyl Benzene/Methacrylic Acid (75/5/20), 79 nm MG-1 was prepared as follows:

| | | |
|---|---|---|
| (A): | Deionized water | 100 g |
| | Potassium persulfate | 0.2 g |
| | Sodium Dodecyl sulfate | 1.6 g |
| (B): | Deionized water | 120 g |
| | Potassium persulfate | 0.45 g |
| | Sodium Dodecyl sulfate | 1.6 g |
| | methyl methacrylate | 48.75 g |
| | methacrylic acid | 13 g |
| | divinyl benzene | 3.25 g |

1. (A) was first charged to a 1L 3-neck flask equipped with a nitrogen inlet, mechanical stirrer and condenser. The flask was immersed in a constant temperature bath at 80° C. and purged with nitrogen for 20 min.
2. (B) was added to the mixture. Agitation was maintained all the time during the feeding of monomer emulsion. The addition time of the monomer emulsion (B) was two hours.
3. The polymerization was continued for 2 hours after the addition of the monomer emulsion.
4. The mixture was cooled to room temperature and filtered.

MG-2—Methyl Methacrylate/Ethylene Glycol Dimethacrylate/Methacrylic Acid (80/10/10), 23 nm MG-2 was prepared as follows. To a 2-liter, glass reaction flask, 989 ml of demineralized water were added. To a 2-liter, glass addition flask, 612 ml of demineralized water were added. The agitators on both flasks were set at 100 RPM. A nitrogen atmosphere was established in the reactor. To the reactor, 31.5 g of Rhodapon UB Std were added. The reactor contents temperature was set at 80° C. To the addition flask, 37.8 g of Rhodapon UB Std, 362.9 g of methyl methacrylate, 45.4 g of ethylene glycol dimethacrylate, and 45.4 g of methacrylic acid were added. When the monomer emulsion was prepared in the addition flask and when the reactor contents temperature was at 80° C., 1.89 g of sodium persulfate were added to the reactor. Within two minutes the monomer emulsion addition was started charging 942 g of monomer emulsion over two hours. When the charge was complete the reactor contents were stirred for two hours at 80° C. The latex was then cooled to 25° C. and filtered.

MG-3—Methyl Methacrylate/Divinyl Benzene/Methacrylic Acid (75/5/20), 51 nm

MG-3 was prepared following the same procedure as for MG-1. The average particle size for this sample was 51 nm.

MG-4—Methyl Methacrylate/Divinyl Benzene/Methacrylic Acid (75/5/20), 42 nm

To a 5-liter, glass reaction flask, 2120 ml of demineralized water were added. To a 2-liter, glass addition flask, 1000 ml of demineralized water were added. The agitators on both flasks were set at 150 RPM. A nitrogen atmosphere was established in the reactor. To the reactor, 45 g of Rhodacal A246L were added. The reactor contents temperature was set at 80° C. To the addition flask, 72 g of Rhodacal A246L, 585 g of methyl methacrylate, 156 g of methacrylic acid and 39 g of 80% divinyl benzene were added. When the monomer emulsion was prepared in the addition flask and when the reactor contents temperature was at 80° C., 8.88 g of potassium persulfate were added to the reactor. Within two minutes the monomer emulsion addition was started 20 ml/min for a two hour charge. When the charge was complete the reactor contents were stirred for two hours at 80° C. The latex was then cooled to 25° C. The pH was adjusted to 6.5 with 1% KOH solution (about 225 g of 1% KOH/liter of latex). The latex was then filtered.

Comparative Particle CP-1—Methyl Methacrylate/2-Acrylamido-2-methyl-1-propanesulfonic acid, Sodium Salt (98/2)

Comparative particle CP-1 was prepared as follows. 400 g deionized water and 2.25 g of sodium dodecyl sulfate (SDS) were charged to a 1-liter three-neck round-bottom flask equipped with a mechanical stirrer and nitrogen inlet. The solution was purged with nitrogen for 30 min and heated to 80° C. in a constant temperature bath. 49 g of methyl methacrylate and 1 g of 2-acrylamido-2-methyl-1-propanesufonic acid(sodium salt) were added and stirred for three minutes. 4.5 g each of 10% sodium persulfate and 10% sodium metabisulfite were added to initiate the polymerization. Polymerization was continued for one hour and heated one more hour at 80° C. Temperature was reduced to 65-70° C. and 1 ml each of t-butyl hydroperoxide (10%) and sodium formaldehyde bisulfite (10%) were post-added. Latex was cooled and filtered. Glass transition temperature was 120° C., average particle size was 13 nm, and % solids was 10.1%.

Comparative Particle CP-2—Styrene/n-Butyl Methacrylate/Ethylene Glycol Dimethacrylate/Methacrylic Acid (45/45/5/5)

Comparative particle CP-2 was prepared as follows. 1080 g of deionized water and 25 g of Rhodacal™ A-246L were charged to a 2-liter three-neck round-bottom flask equipped with mechanical stirrer and nitrogen inlet. The solution was purged with nitrogen for 30 min and heated to 80° C. in a constant temperature bath. 2 g of sodium persulfate was added and stirred for one min. A monomer emulsion comprising 25 g of Rhodacal™ A-246L, 2 g of sodium persulfate, 180 g of styrene, 180 g of n-butyl methacrylate, 20 g of methacrylic acid, and 20 g of ethylene glycol dimethacrylate was pumped in to the reactor over two hours. The polymerization was continued for one more hour. 2 ml each of t-butylhydroperoxide(10%) and sodium formaldehyde bisulfite (10%) were post added and stirred 20 minutes. The latex was cooled and filtered. Glass transition temperature was 79° C., average particle size was 31 nm and % solids was 20.6%.

Comparative particle CP-3—Styrene/Divinyl Benzene/Methacrylic Acid (90/5/5)

The procedure of preparing comparative particle C1 was repeated, except 45 g of styrene, 2.5 g of divinyl benzene and 2.5 g of methyacrlic acid were added in place of methyl methacrylate and 2-acrylamido-2-methyl-1-propanesufonic acid(sodium salt). Glass transition temperature was 130° C., average particle size was 28 nm and % solids was 10.1%.

Comparative Particle CP-4—Ethyl Methacrylate/Methacrylic Acid (90/10)

The procedure of preparing comparative particle C2 was repeated, except 360 g of ethyl methacrylate and 40 g of methyacrlic acid were added in place of styrene, n-butyl methacrylate, methacrylic acid, and ethylene glycol dimethacrylate Glass transition temperature was 113° C., average particle size was 77 nm and % solids was 20.2%.

Comparative Particle CP-5—Colloidal Silica Particles

Ludox AM is a colloidal silica dispersion available from Grace Davison, average particle size is 12 nm.

Comparative Particle CP-6—Aqueous Polyethylene Wax Dispersion

Jonwax 26 is a polyethylene wax dispersion available from Johnson Polymer, average particle size is 36 nm, melting point is 130° C.

Comparative Particle CP-7—Aqueous Polypropylene Wax Dispersion

Jonwax 26 is a polyethylene wax dispersion available from Johnson Polymer, average particle size is 39 nm, melting point is 159° C.

The compositions and properties of the microgel particles and comparative particles described above are summarized in Table 1.

TABLE 1

| Composition | | Wt % polymerizable carboxylic acid monomer | Wt % Difunctional crosslinking agents | Tg | Particle size |
|---|---|---|---|---|---|
| MG-1 | MM/DB/MA | 20% | 5% | 164 C. | 79 nm |
| MG-2 | MM/MA/EGD | 10% | 10% | 144 C. | 23 nm |
| MG-3 | MM/DB/MA | 20% | 5% | | 51 nm |
| MG-4 | MM/DB/MA | 20% | 5% | 157 C. | 42 nm |
| CP-1 | MM/SSDA | 0% | 0% | 120 C. | 13 nm |
| CP-2 | S/BM/EGD/MA | 5% | 5% | 79 C. | 31 nm |
| CP-3 | S/DB/MA | 5% | 5% | 130 C. | 28 nm |
| CP-4 | EM/MA | 10% | 0% | 113 C. | 77 nm |
| CP-5 | Colloidal silica | | | | 12 nm |
| CP-6 | Polyethylene | | | | 36 nm |
| CP-7 | Polypropylene | | | | 39 nm |

MM = Methyl Methacrylate
BM = n-Butyl Methacrylate
DB = Divinylbenzene
EGD = Ethylene Glycol Dimetharcrylate
EM = Ethyl Methacrylate
MA = Methyacrylic Acid
SSDA = sodium 2-sulfo-1,1-dimethylethyl acrylamide
S = Styrene Preparation of Other Polymers Used in Overcoat Inks P-1 (Polyurethane)

In a 1-liter round bottom flask equipped with thermometer, stirrer, water condenser and a vacuum outlet was placed 136 g (0.068 moles) of poly(hexamethylene carbonate) diol (PHMC), avg. $M_n$=2000 (Aldrich 46,116-4). It was dewatered under vacuum at 100° C. The vacuum was released and the following were added at 40° C. while stirring: 57.9 g (0.432 moles) 2,2-bis(hydroxymethyl) propionic acid (BHMPA), 160 g tetrahydrofuran (THF), and 1 mL of stannous octoate (catalyst). The temperature was adjusted to 68° C., and when a homogeneous solution was obtained, 107.8 g (0.485 moles) of isophorone diisocyanate (IPDI) was slowly added, followed by 10 mL THF. The temperature was raised to 72° C. and maintained for about 16 hours to complete the reaction, resulting in an intermediate containing less than 3% of free IPDI. The free IPDI content was monitored by IR spectroscopy of the absorption peak at 2240 wave number.

The reaction mixture was diluted with 200 mL THF, and neutralized with 53.86 g of 45 wt. % KOH solution to achieve 100% stoichiometric ionization based on the amount of BHMPA. Under high shear, 900 mL of distilled water was added and THF was subsequently removed by heating under vacuum to give an aqueous solution of PU-1 at 27.51 wt. % solids. The molecular weights of PU-1 were $M_w$=18,800 and $M_n$=8440; and the AN=80.

P-2 (Styrene-Acrylic Polymer)

P-2 is a styrene-acrylic polymer IJ-4655 obtained from Westvaco Corporation having an AN=230 (Quoted from Westvaco). The solution was prepared by mixing 25 g of Jonrez IJ-4655 with 20.4 grams of water and 54.6 grams of 10% aqueous potassium hydroxide solution until the polymer was completely dissolved. The molecular weight of SA-1 was Mw=16,700 and Mn=5670.

P-3 (Acrylic Polymer)

100 g of diethylene glycol (DEG) and 0.25 g of 2,2'-azo-bisisobutyronitrile (AIBN) were charged to a 1-liter, three-neck round-bottom flask equipped with a mechanical stirrer and nitrogen inlet. The resulting solution was purged with nitrogen for 20 minutes and heated to 150 degrees Centigrade in a constant temperature bath. In a separate container, 100 g of DEG, 0.25 g of AIBN, 33.5 g of benzyl methacrylate (BM), and 16.5 g of methacrylic acid (MA) were combined, mixed well, and then added to the first solution over 2 hours. Polymerization was continued for 3 hours. The temperature was reduced to 65-70 degrees Centigrade, and 1 mL each of t-butyl hydroperoxide (10 weight percent) and sodium formaldehyde bisulfite (10 weight percent) were then added. The resulting polymer was isolated and a 20 wt. % aqueous solution prepared by neutralizing the polymer to 65-70 wt. % with potassium hydroxide.

The number average molecular weight of the resulting polymer was determined by size-exclusion chromatography using a PLGel™ Mixed-B column (Polymer Laboratories) in tetrahydrofuran solvent and calibrated with polystyrene standards having a narrow a molecular weight distribution between 580 and 2,300,000. The resulting random copolymer of BM/MA in a 67/33 weight ratio was found to have a number average molecular weight of 4960 and a weight average molecular weight of 7580. The calculated acid number is 215.

Preparation of Overcoat Inks

Inks were prepared by mixing all the components at room temperature. All inks contained diethylene glycol at 10 wt. %, ethyleneglycol monobutylether (Dowanol® DB from Dow Chemical Co.) at 2.5 wt. %, Silwet® L-77 (Osi Specialties, Inc.) at 0.5 wt. %, the polymers of choice and the balance water.

Printing and Evaluation

A Canon i960 Photo Printer from Canon U.S.A., Inc. was used to print the ink compositions described above. For each ink composition, a test patch about 25 cm² was printed at 100% ink coverage and allowed to dry at ambient conditions overnight for stain test. Each ink composition was printed on the following ink jet recording media:

Media A: Epson Premium Glossy Photo Paper (# S041286) from Epson America, Inc.

Media B: Canon Photo Paper Pro (no catalogue #) from Canon U.S.A., Inc.

Media C: 7 mil Teslin SP (porous) Synthetic Printing Sheet (PPG Industries Inc.), a polyolefin-based highly filled microporous film, typically comprising about 60% by weight of inorganic filler and about 65% by volume air.

Media D: Kodak Picture Paper (catalogue # 1124346) from Eastman Kodak Company.

Void volume measurements and median pore size measurements were made via the mercury intrusion porosimetry method with the Micromeritics AutoPore IV instrument model 9500. The media was subjected to increasing hydraulic pressure on a volume of mercury in the penetrometer, which also contained the media. As the pressure was increased on the mercury, the mercury begins to intrude on penetrate into the pores of the media, largest pores filling first at the lowest pressure. As the pressure ramped from slightly above atmospheric to a maximum of 60,000 psi, an accumulation of data of mercury intruded vs. pressure was collected. The pressure was transformed into equivalent cylindrical pore diameter and the total mercury volume intruded in a specific range was the total pore volume while the 50% point in that range was the median pore diameter. The results are listed in Table 2.

TABLE 2

| Ink jet Media | Median Pore Diameter |
|---|---|
| Media A | 16 nm |
| Media B | 22 nm |
| Media C | 68 nm |
| Media D | 135 nm |

Jettability was judged based on the printed image, good jettability was assigned when the media was uniformly printed with overcoat ink, and poor jettability was assigned when a substantial number of nozzles did not jet.

The printed patch was stained by placing 0.2 mL of Hawaiian Punch® fruit juice on the surface that filled a dot having a diameter of about 1 cm. After one minute, the surface of print was rinsed with deionized water to remove the fruit juice and then was air-dried.

The reflection density of stained area was measured using an X-Rite® Model 820; the green density reading was recorded for comparison.

Example 1

A set of inks varying in polymer and particles as described in Table 3 were prepared, printed and evaluated. Ink identification with a prefix I denotes an ink of the present invention, and that with a prefix C denotes a comparative ink. As Comparative inks C-3, C-4 and C-5, using comparison particles, would not jet well or did not jet at all, no evaluation was carried out further. Others were printed and tested for stain resistance, and the results are shown in Table 4.

TABLE 3

| Ink ID | Polymer in ink (wt %) | Particle in ink (wt %) | Jettability |
|---|---|---|---|
| C-1 | P-2 (4%) | None | Good |
| C-2 | P-2 (5%) | None | Good |
| C-3 | P-2 (3%) | CP-5 (0.25%) | Poor |
| C-4 | P-2 (3%) | CP-6 (0.5%) | Would not jet |
| C-5 | P-2 (3%) | CP-7 (0.5%) | Would not jet |
| I-1 | P-2 (4%) | MG-2 (1%) | Good |
| I-2 | P-2 (4%) | MG-3 (1%) | Good |

TABLE 4

| Ink ID | Stain density on Media A | Stain Density on Media B | Stain Density on Media C | Stain Density on Media D |
|---|---|---|---|---|
| No protective ink printed on media | 0.17 | 0.23 | 0.24 | 0.26 |
| C-1 | 0.21 | 0.09 | 0.08 | 0.17 |
| C-2 | 0.19 | 0.08 | 0.08 | 0.17 |
| I-1 | 0.06 | 0.09 | 0.10 | 0.07 |
| I-2 | 0.06 | 0.08 | 0.04 | 0.06 |

The results in Table 4 show that the media was easily stained. Comparative inks C-1 and C-2 offered stain resistance to media B and media C only. The inks of the invention, I-1 and I-2, not only jetted well, but also provided satisfactory stain resistance for all the media tested.

Example 2

A set of inks varying in polymer and particle composition as described in Table 5 were prepared, printed and evaluated.

Comparative inks C-7 to C-10 used comparative polymer particles, and they either jetted poorly or did not jet at all, thus no further test was carried out. The stain resistance results for the rest of inks are shown in Table 6.

TABLE 5

| Ink ID | Polymer in ink (wt %) | Particle in ink (wt %) | Jettability |
|---|---|---|---|
| C-6 | P-2 (2%) P-3 (2%) | None | Good |
| C-7 | P-2 (2%) P-3 (2%) | CP-1 (1%) | Poor |
| C-8 | P-2 (2%) P-3 (2%) | CP-2 (1%) | Poor |
| C-9 | P-2 (2%) P-3 (2%) | CP-3 (1%) | Would not jet |
| C-10 | P-2 (2%) P-3 (2%) | CP-4 (1%) | Poor |
| I-3 | P-2 (2%) P-3 (2%) | MG-2 (1%) | Good |

TABLE 6

| Ink ID | Stain density on Media A | Stain Density on Media B | Stain Density on Media C | Stain Density on Media D |
|---|---|---|---|---|
| C-6 | 0.08 | 0.12 | 0.12 | 0.08 |
| I-3 | 0.08 | 0.10 | 0.06 | 0.08 |

The results in Table 6 show that the ink of the invention, I-3, provides somewhat improved stain resistance over comparative ink C-6.

Example 3

Several sets of inks listed in Table 7 were prepared wherein the comparative inks did not contain any microgel particles and the inks of this invention contained the microgel particles. The stain resistance results are shown in Table 8 below.

TABLE 7

| Ink ID | Polymer in ink (wt %) | Particle in ink (wt %) | Jettability |
|---|---|---|---|
| C-11 | P-1 (4%) | None | Good |
| I-4 | P-1 (4%) | MG-1 (1%) | Good |
| C-12 | P-2 (1%) P-3 (3%) | None | Good |
| C-13 | P-2 (1%) P-3 (4%) | None | Good |
| I-5 | P-2 (1%) P-3 (3%) | MG-2 (1%) | Good |
| C-14 | P-1 (1%) P-3 (3%) | None | Good |
| I-6 | P-1 (1%) P-3 (3%) | MG-3 (1%) | Good |
| C-15 | P-3 (3.2%) | None | Good |
| I-7 | P-3 (3.2%) | MG-4 (1%) | Good |

TABLE 8

| Ink ID | Stain density on Media A | Stain Density on Media B | Stain Density on Media C | Stain Density on Media D |
|---|---|---|---|---|
| C-11 | 0.09 | 0.08 | 0.09 | 0.13 |
| I-4 | 0.05 | 0.08 | 0.04 | 0.06 |
| C-12 | 0.05 | 0.08 | 0.11 | 0.07 |
| C-13 | 0.05 | 0.08 | 0.11 | 0.06 |
| I-5 | 0.05 | 0.08 | 0.03 | 0.06 |
| C-14 | 0.05 | 0.07 | 0.11 | 0.06 |
| I-6 | 0.05 | 0.08 | 0.04 | 0.07 |
| C-15 | 0.05 | 0.07 | 0.14 | 0.06 |
| I-7 | 0.05 | 0.07 | 0.04 | 0.06 |

For each set of comparison, e.g. C-11 vs. I-4, C-12 and C-13 vs. I-5, etc, it is clearly shown that the addition of the microgel particles improved stain protection for a variety of different media.

The invention has been described in detail with particular reference to certain preferred embodiments thereof, but it will be understood that variations and modifications can be effected within the spirit and scope of the invention.

The invention claimed is:

1. A ink jet ink composition comprising an aqueous medium and microgel particles, said particles comprising a crosslinked copolymer prepared from a monomer mixture comprising at least a crosslinking monomer, a polymerizable carboxylic acid monomer, and one or more polymerizable water insoluble vinyl monomers.

2. The ink composition of claim 1 wherein the microgel particles have an average particle size of less than 80 nm.

3. The ink composition of claim 1 wherein the microgel particles have an average particle size of 20 to 80 nm.

4. The ink composition of claim 1 wherein the microgel particles have an average particle size of 30 to 70 nm.

5. The ink composition of claim 1 wherein the microgel particles have a Tg equal to or greater than 100° C.

6. The ink composition of claim 1 wherein the monomer mixture comprises, based on the total weight of the monomer mixture, 5 wt % to 50 wt % of the polymerizable carboxylic acid monomer, 1 wt % to 20 wt % of the crosslinking monomer, and 30 wt % or more of the plymerizable water-insoluble vinyl monomer.

7. The ink composition of claim 6 wherein the monomer mixture comprise 10 wt % to wt 30% of the polymerizable carboxylic acid monomer.

8. The ink composition of claim 7 wherein the microgel particles have an avenge particle size of 20 to 80 nm and a Tg equal to or greater than 100° C.

9. The ink composition of claim 1 wherein said microgel particles are prepared by the polymerization of a monomer mixture comprising at least methyl methacrylate, methacrylic acid and a crosslinking monomer.

10. The ink composition of claim 9 wherein the monomer mixture comprises 60 wt % to 85 wt.% methylmethacrylate, 10 wt % to 30 wt.% methacrylic acid, and 2 wt % to 15 wt.% of the crosslinking monomer.

11. The ink composition of claim 1 wherein the crosslinking monomer is divinyl benzene or ethylene glycol dimethacrylate.

12. The ink composition of claim 9 wherein the crosslinking monomer is divinyl benzene or ethylene glycol dimethacrylate.

13. The ink composition of claim 1 wherein the ink is substantially colorless.

14. The ink composition of claim 1 further comprising a polyurethane polymer that has an acid number of 60 to 100 and a molecular weight of greater than 10,000.

15. The ink composition of claim 1 further comprising an acrylic polymer that has an acid number greater than 180 and a molecular weight of less than 18,000.

16. The ink composition of claim 14 wherein the polyurethane polymer has a molecular weight of 10,000 to 30,000.

17. The ink composition of claim 1 further comprising at least two different polymers, a first polymer and a second polymer, having a weight average acid number of 70 to 200.

18. The ink composition of claim 17 wherein the first polymer has an acid number of 60 to 100 and the second polymer has an acid number of 180 to 240.

19. The ink composition of claim 17 wherein the at least two different polymers have a weight average acid number of 80 to 160.

20. The ink composition of claim 18 wherein the ratio of the first polymer to the second polymer is 1:10 to 10:1.

21. The ink composition of claim 17 wherein the polymers are of two different classes of polymers.

22. The ink composition of claim 18 wherein the polymers are of two different classes of polymers.

23. The ink composition of claim 18 wherein the polymers are polyester, polyurethane or polymers derived from styrene and/or acrylic acid monomers selected from the group consisting of styrene, the o-,m-,and p-alkyl or aryl styrenes wherein the substituent group has from 1 to 8 carbon atoms; halostyrenes; vinyl toluene; isopropenyl toluene; and vinylnaphthalene; alkyl or aryl esters of the ethylenically unsaturated carboxylic acids having from 1 to about 8 carbon atoms in the ester (alcohol) group; nitrile monomers; vinylesters; and mixtures thereof.

24. The ink composition of claim 22 wherein the polymers are polyester, polyurethane or polymers derived from styrene and/or acrylic acid monomers acid monomers selected from the group consisting of styrene, the o-,m-,and p-alkyl or aryl styrenes wherein the substituent group has from 1 to 8 carbon atoms; halostyrenes: vinyl toluene; isopropenyl toluene; and vinylnaphthalene; alkyl or aryl esters of the ethylenically unsaturated carboxylic acids having from 1 to about 8 carbon atoms in the ester (alcohol) group; nitrile monomers; vinylesters; and mixtures thereof.

25. The ink composition of claim 17 wherein the molecular weight of both polymers is independently within the range of 6,000 to 30,000.

26. The ink composition of claim 18 wherein the molecular weight of both polymers is independently within the range of 6,000 to 30,000.

27. The ink composition of claim 18 wherein the first polymer is a condensation polymer that has an acid number of 60 to 100 and a molecular weight of greater than 10,000, and the second polymer is an addition polymer that has an acid number greater than 180 and a molecular weight of less than 18,000.

28. The ink composition of claim 18 wherein the first polymer is a polyurethane polymer that has an acid number of 60 to 100 and a molecular weight of greater than 10,000, and the second polymer is an acrylic polymer that has an acid number greater than 180 and a molecular weight of less than 18,000.

29. The ink composition of claim 28 wherein the acrylic polymer is a copolymer comprising benzyl methacrylate and methacrylic acid.

30. The ink composition of claim 28 wherein the acrylic polymer is a copolymer comprising a styrene and an acrylic acid monomer selected from the group consisting of styrene, the o-,m-,and p-alkyl or aryl styrenes wherein the substituent group has from 1 to 8 carbon atoms; halostyrenes; vinyl toluene; isopropenyl toluene; and vinylnaphthalene; alkyl or aryl esters of the ethylenically unsaturated carboxylic acids having from 1 to about 8 carbon atoms in the ester (alcohol) group; nitrile monomers; vinylesters; and mixtures thereof.

31. The ink composition of claim 28 wherein the ratio of the polyurethane polymer to the acrylic polymer is 1:2 to 4:1.

32. The ink composition of claim 28 wherein the polyurethane polymer has a molecular weight of 10,000 to 30,000.

33. The ink composition of claim 28 wherein the polyurethane polymer has an acid number of 70 to 90.

34. The ink composition of claim 28 wherein the acid number of the polyurethane polymer is provided by carboxylic acid groups.

35. The ink composition of claim 17 wherein 50% or more of the acid groups of each of the first and second polymers are neutralized.

36. The ink composition of claim 28 wherein 50% or more of the acid groups of each of the first and second polymers are neutralized.

37. The ink composition of claim 28 wherein the polyurethane polymer is present in an amount of up to 20% by weight of the composition and the acrylic polymer is present in an amount of up to 20% by weight of the composition.

38. The ink composition of claim 28 wherein the polyurethane polymer is present in an amount of up to 5% by weight of the composition and the acrylic polymer is present in an amount of up to 5% by weight of the composition.

39. The ink composition of claim 28 wherein the polyurethane polymer has a molecular weight of 10,000 to 25,000, an acid number of 70 to 90 wherein the acid number is provided by carboxylic acid groups, and wherein the polyurethane is derived from at least a first polycarbonate monomer comprising at least two hydroxyl groups, a second monomer comprising at least two hydroxyl groups and at least one carboxylic acid group, and a monomer comprising at least two isocyanate groups; wherein the acrylic polymer has a molecular weight of 6,000 to 16,000, an acid number of 200 to 240, and wherein the acrylic polymer is a copolymer comprising styrene and acrylic acid; and wherein 50% or more of the acid groups of each of the first and second polymers are neutralized.

40. The ink composition of claim 14 wherein the ink is substantially colorless.

41. The ink composition of claim 15 wherein the ink is substantially colorless.

42. The ink composition of claim 17 wherein the ink is substantially colorless.

43. The ink composition of claim 28 wherein the ink is substantially colorless.

44. An ink jet ink set comprising at least one substantially colorless ink composition comprising an aqueous medium and microgel particles, said particles comprising a crosslinked copolymer prepared from a monomer mixture comprising at least a crosslinking monomer, a polymerizable carboxylic acid monomer, and one or more polymerizable water insoluble vinyl monomers; and at least one colored ink comprising an aqueous medium and a pigment or a dye.

45. The ink set of claim 44 wherein the substantially colorless ink further comprises a polyurethane polymer that has an acid number of 60 to 100 and a molecular weight of greater than 10,000.

46. The ink set of claim 44 wherein the substantially colorless ink further comprises an acrylic polymer that has an acid number greater than 180 and a molecular weight of less than 18,000.

47. The ink set of claim 44 wherein the substantially colorless ink further comprises at least two different polymers, a first polymer and a second polymer, having a weight average acid number of 70 to 200.

48. The ink set of claim 47 wherein the first polymer has an acid number of 60 to 100 and the second polymer has an add number of 180 to 240.

49. The ink set of claim 47 wherein the at least two different polymers have a weight average add number of 80 to 160.

50. The ink set of claim 47 wherein the first polymer is a polyurethane polymer that has an acid number of 60 to 100 and a molecular weight of greater than 10,000, and the second polymer is an acrylic polymer that has an acid number greater than 180 and a molecular weight of less than 18,000.

51. The ink set of claim 50 wherein 50% or more of the acid groups of each of the first and second polymers are neutralized.

52. The ink set of claim 44 wherein the colored ink further comprises microgel particles, said particles comprising a crosslinked copolymer prepared from a monomer mixture comprising at least a crosslinking monomer, a polymerizable carboxylic acid monomer, and one or more polymerizable water insoluble vinyl monomers.

53. The ink set of claim 52 wherein the colored ink further comprises a polyurethane polymer that has an add number of 60 to 100 and a molecular weight of greater than 10,000.

54. The ink set of claim 52 wherein the colored ink further comprises an acrylic polymer that has an acid number greater than 180 and a molecular weight of less than 18,000.

55. The ink set of claim 52 wherein the colored ink further comprises at least two different polymers, a first polymer and a second polymer, having a weight average acid number of 70 to 200.

56. The ink set of claim 55 wherein the first polymer of the colored ink has an acid number of 60 to 100 and the second polymer of the colored ink has an acid number of 180 to 240.

57. The ink set of claim 55 wherein the at least two different polymers of the colored ink have a weight average acid number of 80 to 160.

58. The ink set of claim 55 wherein the first polymer of the colored ink is a polyurethane polymer that has an acid number of 60 to 100 and a molecular weight of greater than 10,000, and the second polymer of the colored ink is an acrylic polymer that has an acid number greater than 180 and a molecular weight of less than 18,000.

59. The ink set of claim 58 wherein 50% or more of the acid groups of each of the first and second polymers are neutralized.

60. An ink jet printing method comprising the steps of:
A) providing an ink jet printer that is responsive to digital data signals;
B) loading said printer with an ink jet recording element
C) loading said printer with an ink jet ink composition comprising microgel particles, said particles comprising a crosslinked copolymer prepared from a monomer mixture comprising at least a crosslinking monomer, a polymerizable carboxylic acid monomer, and one or more polymerizable water insoluble vinyl monomers; and
D) printing on said ink jet recording element using said colorless ink jet composition in response to said digital data signals.

61. The ink jet printing method of claim 60 wherein the printer comprises a thermal printhead.

62. The ink jet printing method of claim 60 wherein the ink further comprises a polyurethane polymer that has an acid number of 60 to 100 and a molecular weight of greater than 10,000.

63. The ink jet printing method of claim 60 wherein the ink further comprises an acrylic polymer that has an acid number greater than 180 and a molecular weight of less than 18,000.

64. The ink jet printing method of claim 60 wherein the ink further comprises at least two different polymers, a first polymer and a second polymer, having a weight average acid number of 70 to 200.

65. The ink jet printing method of claim 64 wherein the first polymer has an acid number of 60 to 100 and the second polymer has an acid number of 180 to 240.

66. The ink jet printing method of claim 64 wherein the first polymer is a polyurethane polymer that has an acid number of 60 to 100 and a molecular weight of greater than 10,000, and the second polymer is an acrylic polymer that has an acid number greater than 180 and a molecular weight of less than 18,000.

67. The ink jet printing method of claim 60 wherein the ink jet ink is substantially colorless.

* * * * *

UNITED STATES PATENT AND TRADEMARK OFFICE
CERTIFICATE OF CORRECTION

PATENT NO. : 7,449,501 B2  Page 1 of 1
APPLICATION NO. : 10/984302
DATED : November 11, 2008
INVENTOR(S) : Uerz et al.

It is certified that error appears in the above-identified patent and that said Letters Patent is hereby corrected as shown below:

Column 20, claim 6, line 40, delete "plymerizable" and insert -- polymerizable --.

Column 20, claim 7, line 43, delete "wt 30%" and insert -- 30 wt% --.

Column 20, claim 8, line 46, delete "avenge" and insert -- average --.

Column 21, claim 24, line 33, delete the second occurrence of "acid monomers.".

Column 21, claim 24, line 36, delete "halostyrenes:" and insert -- halostyrenes; --.

Column 23, claim 48, line 6, delete "add" and insert -- acid --.

Column 23, claim 49, line 9, delete "add" and insert -- acid --.

Column 23, claim 53, line 26, delete "add" and insert -- acid --.

Column 24, claim 60, line 10, after "B) loading said printer with an ink jet recording element" insert -- ; --.

Signed and Sealed this

Fourteenth Day of April, 2009

JOHN DOLL
*Acting Director of the United States Patent and Trademark Office*